US012748405B2

(12) United States Patent
Sethi et al.

(10) Patent No.: US 12,748,405 B2
(45) Date of Patent: Sep. 29, 2026

(54) DEVICE AND COMPONENT STATE PREDICTION AND FAILURE PREVENTION

(71) Applicant: Dell Products L.P., Round Rock, TX (US)

(72) Inventors: Parminder Singh Sethi, Ludhiana (IN); Lakshmi Saroja Nalam, Bangalore (IN); Atishay Jain, Meerut (IN)

(73) Assignee: Dell Products L.P., Round Rock, TX (US)

( * ) Notice: Subject to any disclaimer, the term of this patent is extended or adjusted under 35 U.S.C. 154(b) by 886 days.

(21) Appl. No.: 17/982,994

(22) Filed: Nov. 8, 2022

(65) Prior Publication Data

US 2024/0160189 A1 May 16, 2024

(51) Int. Cl.
*G05B 19/41* (2006.01)
*G05B 19/418* (2006.01)

(52) U.S. Cl.
CPC ... *G05B 19/4184* (2013.01); *G05B 19/41845* (2013.01); *G05B 19/41865* (2013.01)

(58) Field of Classification Search
CPC .......... G05B 19/4184; G05B 19/41845; G05B 19/41865; G05B 23/0289; G05B 23/024
See application file for complete search history.

(56) References Cited

U.S. PATENT DOCUMENTS 10,810,508 B1 * 10/2020 Maximo ............... G06F 16/906
2016/0350671 A1 * 12/2016 Morris, II .......... G05B 23/0229
2019/0251468 A1 * 8/2019 Guillame-bert .......... G06N 7/01
2019/0311273 A1 * 10/2019 Cohen ...................... G06N 7/01
2021/0097449 A1 * 4/2021 Chattopadhyay ...... G06N 20/20

OTHER PUBLICATIONS

B. Ambielli et al., "Gini Impurity (with Examples)" https://bambielli.com/til/2017-10-29-gini-impurity/, Oct. 29, 2017, 4 pages.

* cited by examiner

*Primary Examiner* — Christopher W Carter
(74) *Attorney, Agent, or Firm* — Ryan, Mason & Lewis, LLP

(57) ABSTRACT

Techniques for state prediction and failure prevention are disclosed. For example, a method comprises receiving data corresponding to operation of a plurality of elements, wherein the plurality of elements comprise at least one of a plurality of devices and a plurality of device components. The data corresponding to the operation of the plurality of elements comprises one or more operational states for respective ones of the plurality of elements. Using one or more machine learning algorithms, a future operational state of one or more elements of the plurality of elements is predicted. The prediction is based, at least in part, on the data corresponding to the operation of the plurality of elements. Using the one or more machine learning algorithms, one or more actions to prevent the one or more elements from transitioning to the future operational state are identified.

20 Claims, 17 Drawing Sheets

300

| Device | Component from which alert is generated | Alert type | Severity of the alert | Transition of the component or device states | Device failure |
|---|---|---|---|---|---|
| R710 | HDD | Head failure | **Critical** | Head failure → Medium error count on HDD → System crash | **Yes** |
| R710 | DIMM | Configuration mismatch | Medium | DIMM failure → Performance degraded by 10% | No |
| R720 | CPU | Unrecoverable machine failure | **Critical** | CPU failure → System crash | **Yes** |
| R720 | CPU | Soft error | Medium | CPU failure → No System display | No |
| R710 | HDD | Medium error counts | **Critical** | Memory counts on HDD → RAID group failure → System crash | **Yes** |
| R710 | Motherboard | Aging of battery | **Critical** | Motherboard failure → System crash | **Yes** |
| R720 | Motherboard | Overheat | Medium | Motherboard failure → DIMM failure → Performance degraded by 10% | No |
| R720 | Fan | Dust | **Critical** | Fan failure → Overheat of CPU → CPU failure → System crash | **Yes** |
| R710 | Fan | Reduced speed | Medium | Fan failure → Performance degraded by 10% | No |
| R710 | HDD | RAID group failure | **Critical** | RAID group failure → System crash | **Yes** |

FIG. 3

400

| Current | Next | Duration |
|---|---|---|
| Fan Failure | Performance degraded by 10% | 48 hours |
| Fan Failure | Overheat of CPU | 72 hours |
| Fan Failure | HDD head failure | 48 hours |
| Fan Failure | DIMM failure | 72 hours |
| Fan Failure | System crash | 240 hours |

FIG. 4

500

| **Current** | **Next** | **Duration** |
|---|---|---|
| Medium error counts of HDD | RAID group failure | 96 hours |
| Medium error counts of HDD | HDD head failure | 48 hours |
| Medium error counts of HDD | System crash | 240 hours |

FIG. 5

900

| Model | Component | Issue reported date | Operational data-based issue seen date | Issue | Mitigation steps | Issue closure date | Operational data-based issue closure date | Previous state | Next state |
|---|---|---|---|---|---|---|---|---|---|
| Precision 5530 | Hard drive | 12/2/2021 | 12/1/2021 | Data write errors | Fan was replaced (A) | Not Available | 12/5/2021 | Fan failure | HDD failure |
| Precision 5530 | Fan | 12/2/2021 | 12/2/2021 | Overheating of HDD | Fan was replaced(A) | 12/5/2021 | 12/5/2021 | Fan failure | CPU failure |
| Latitude 3850 | Hard drive | 12/2/2021 | 12/1/2021 | Data write errors | Drive Usage is more than 98 percent (B) | 12/3/2021 | Not Available | All components are good | HDD failure |
| Latitude 3850 | Battery | 12/2/2021 | 12/1/2021 | Battery is not getting charged | Battery was replaced ( C) | 12/18/2021 | 12/16/2021 | | |
| Precision 5530 | CPU | 12/4/2021 | 12/3/2021 | Overheating of CPU | Fan was replaced (A) | 12/10/2021 | 12/10/2021 | Fan failure | HDD failure |
| Precision 5530 | CPU | 12/4/2021 | 12/3/2021 | Overheating of CPU | CPU was replaced (D) | 12/8/2021 | 12/7/2021 | No system display | CPU failure |

FIG. 9

1000

| **Model** | **Mitigation steps** |
|---|---|
| Precision 5530 | Fan was replaced (A) |
| Precision 5530 | Fan was replaced(A) |
| Latitude 3850 | Drive Usage is more than 98 percentage (B) |
| Latitude 3850 | Battery was replaced ( C) |
| Precision 5530 | Fan was replaced (A) |
| Precision 5530 | CPU was replaced (D) |

FIG. 10

1300

| Model | Component | Issue reported date | Operational data-based issue seen date | Issue |
|---|---|---|---|---|
| Precision 5530 | CPU | 12/4/2021 | 12/3/2021 | Overheating of CPU |

FIG. 13

DEVICE AND COMPONENT STATE PREDICTION AND FAILURE PREVENTION

FIELD

The field relates generally to information processing systems, and more particularly to device and component management in such information processing systems.

BACKGROUND

When devices or components thereof malfunction, a support case may be opened and shared with technical support personnel. The support case may be assigned a priority level based on the detected malfunction. In some cases, if the priority level does not indicate a serious issue, there may some delay before support personnel attend to the problem. As a result of the delay, the severity of the case may escalate to a point where the affected devices or components are rendered inoperable and unable to be recovered before the issue is addressed.

SUMMARY

Embodiments provide a state prediction and failure prevention platform in an information processing system.

For example, in one embodiment, a method comprises receiving data corresponding to operation of a plurality of elements, wherein the plurality of elements comprise at least one of a plurality of devices and a plurality of device components. The data corresponding to the operation of the plurality of elements comprises one or more operational states for respective ones of the plurality of elements. Using one or more machine learning algorithms, a future operational state of one or more elements of the plurality of elements is predicted. The prediction is based, at least in part, on the data corresponding to the operation of the plurality of elements. Using the one or more machine learning algorithms, one or more actions to prevent the one or more elements from transitioning to the future operational state are identified.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 3 depicts a table of collated device and component data including component or device state transitions in an illustrative embodiment.

FIG. 4 depicts a table including a current state of fan failure and durations to transition to different states in an illustrative embodiment.

FIG. 5 depicts a table including a current state of medium error counts of a hard disk drive (HDD) and durations to transition to different states in an illustrative embodiment.

FIG. 9 depicts a table including sample data used for generating a decision tree to identify mitigation steps to prevent component or device failure in an illustrative embodiment.

FIG. 10 depicts a table based on the table in FIG. 9 and depicting the mitigation steps performed for different device models in an illustrative embodiment.

FIG. 13 depicts a table including sample issue data used for a component in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

Figure 1:
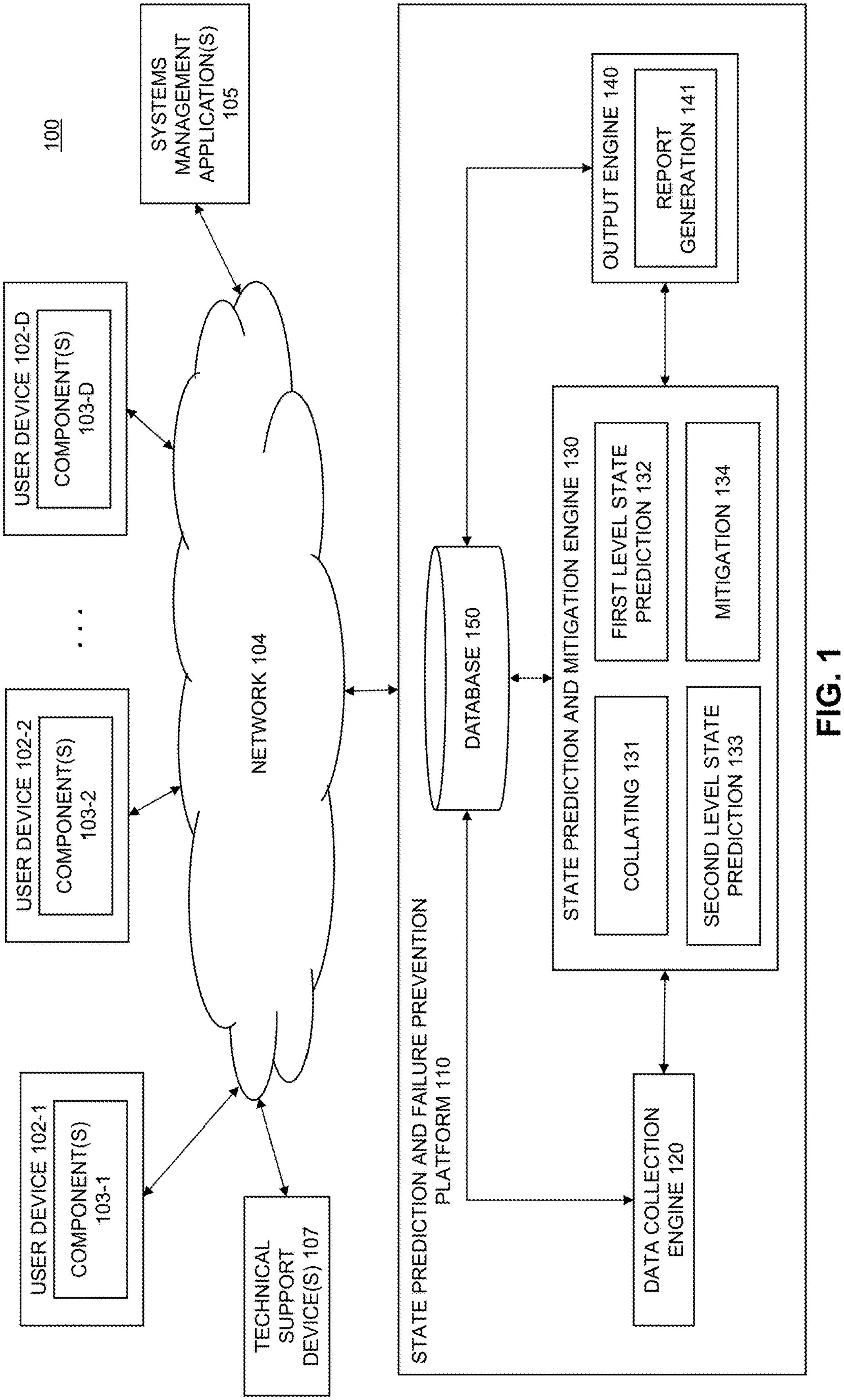
FIG. 1 depicts an information processing system with a state prediction and failure prevention platform for predicting device or component states and identifying steps to prevent failure in an illustrative embodiment.

FIG. 1 shows an information processing system 100 configured in accordance with an illustrative embodiment. The information processing system 100 comprises user devices 102-1, 102-2, . . . 102-D (collectively "user devices 102"), one or more systems management applications 105 and one or more technical support devices 107. Each of the user devices 102 includes one or more components 103-1, 103-2, . . . , 103-D (collectively "components 103"). The user devices 102, systems management applications 105 and technical support devices 107 communicate over a network 104 with a state prediction and failure prevention platform 110. The variable D and other similar index variables herein such as K and L are assumed to be arbitrary positive integers greater than or equal to one.

In a datacenter or other computing environment, systems management applications 105 monitor user devices 102 uninterruptedly and can provide remedial measures to address device and/or component issues identified in alerts received from the user devices 102. When an alert from a user device 102 is generated, the operational details of a faulty component may be collected by the systems management application 105 at the time of occurrence of the issue or failure of the component. A support case with this operational data and appropriate priority levels may be shared with technical support personnel via, for example, the one or more technical support devices 107.

The user devices 102, technical support devices 107 and devices on which the systems management applications 105 are executed comprise, for example, desktop, laptop or tablet computers, servers, host devices, storage devices, mobile telephones, Internet of Things (IoT) devices or other types of processing devices capable of communicating with the state prediction and failure prevention platform 110 over the network 104. Such devices are examples of what are more generally referred to herein as "processing devices." Some of these processing devices are also generally referred to herein as "computers." The user devices 102, technical support devices 107 and devices on which the systems management applications 105 are executed may also or alternately comprise virtualized computing resources, such as virtual machines (VMs), containers, etc. The user devices 102, technical support devices 107 and devices on which the systems management applications 105 are executed in some embodiments comprise respective computers associated with a particular company, organization or other enterprise.

The terms "user," "customer," "client," "personnel" or "administrator" herein are intended to be broadly construed so as to encompass numerous arrangements of human, hardware, software or firmware entities, as well as combinations of such entities. State prediction and failure prevention services may be provided for users utilizing one or more machine learning models, although it is to be appreciated that other types of infrastructure arrangements could be used. At least a portion of the available services and functionalities provided by the state prediction and failure prevention platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the state prediction and failure prevention platform 110, as well as to support communication between the state prediction and failure prevention platform 110 and connected devices (e.g., user devices 102, technical support devices 107 and devices on which the systems management applications 105 are executed) and/or other related systems and devices not explicitly shown.

In some embodiments, the user devices 102, technical support devices 107 and/or devices on which the systems management applications 105 are executed are assumed to be associated with repair and/or support technicians, system administrators, information technology (IT) managers, software developers, release management personnel or other authorized personnel configured to access and utilize the state prediction and failure prevention platform 110.

The state prediction and failure prevention platform 110 in the present embodiment is assumed to be accessible to the user devices 102, technical support devices 107 and devices on which the systems management applications 105 are executed and vice versa over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Referring to FIG. 1, the state prediction and failure prevention platform 110 includes a data collection engine 120, a state prediction and mitigation engine 130, an output engine 140 and a database 150. The state prediction and mitigation engine 130 comprises a collating layer 131, a first level state prediction layer 132, a second level state prediction layer 133 and a mitigation layer 134. The output engine 140 comprises a report generation layer 141.

According to one or more embodiments, operational data (e.g., hardware component and firmware information) of the user devices 102 and/or components 103 can be recorded automatically by the systems management applications 105 and/or the data collection engine 120. For example, the operational data can be recorded at pre-defined time intervals set by, for example, the systems management applications 105. The systems management applications 105 may comprise, for example, one or more data collection applications such as, but not necessarily limited to, SupportAssist Enterprise available from Dell Technologies. In illustrative embodiments, the systems management applications 105 and/or the data collection engine 120 collect operational data from the user devices 102 and/or the components 103 by tracking service requests, through scheduled collections at designated times and/or through event-based collections. In some embodiments, the data collection engine 120 receives pushed data or collects data from the user devices 102, components 103 and/or the systems management applications 105.

When service requests for repair or to address issues corresponding to given ones of the user devices 102 or components 103 are initiated, the systems management applications 105 and/or data collection engine 120 processes the service requests and collects operational data associated with the subject user device 102 and/or components 103 identified in the service request. Scheduled collections occur at pre-defined times or intervals specified by, for example, a user via one or more user devices 102 or automatically scheduled by the systems management applications 105 and/or data collection engine 120. Event-based collections are triggered by one or more events such as, but necessarily limited to, component or device failure, a detected degradation of performance of a component or device, installation of new software or firmware, the occurrence of certain operations, etc. In some embodiments, an integrated Dell® remote access controller (iDRAC) causes the data collection engine 120 and/or systems management applications 105 to collect operational data from one or more user devices 102 and/or components 103 and to export the collected data to a location (e.g., database or cache) on the state prediction and failure prevention platform 110 or to a shared network location (e.g., centralized database). In some embodiments, the operational data is stored in a portion of the database 150.

In some situations, the operational data is supplied to support teams via one or more technical support devices 107. The operational data helps support personnel resolve issues by providing the support teams with collected logs describing the reason of failure in a particular component 103 or in a user device 102 as a whole.

In an operational example, a component (e.g., hard disk drive (HDD)) of a server reports a performance issue. This is "State A" of the device and operational data related to the HDD is collected. With these details, a systems management application 105 opens a case with a priority level of, for example, "medium" and is transmits the case to technical support personnel at a time (t1) (e.g., via technical support device 107). With current approaches, depending on the assigned priority level of the case, it takes time for the support team to provide a resolution for the performance issue. In the meantime, the HDD may stop working ("State B") and another alert would be generated. The related details for State B are captured as operational data at time (t2). By the time the operational data is again collected at time (t3), severity of the case has increased, and there may be instances where the server fails to perform vital functions (e.g., fails to load the operating system (OS) and is rendered non-responsive) ("State C"). State C represents a critical failure and a "critical" priority case is transmitted to a technical support team. At this time (t3), the data availability of the data in the server is at risk, and the data may not be recovered at this point.

The illustrative embodiments attempt to address the above problems by providing techniques which use machine learning to mitigate the risk of data unavailability and commence mitigation steps well in advance of issue escalation. With conventional approaches, based on the severity (e.g., priority) of a support ticket, there is a turnaround time (yl) required for a technical support team to analyze an issue for an impacted device, perform mitigation steps, and verify and close an issue. Within that time yl, the impacted device may transition to another more critical state. However, the technical support team may be unaware of the most recent state and perform mitigation steps based on the ticket raised at time t1. Such a scenario can cause the impacted device to reach an unrecoverable state before the issue is resolved or, in some cases, before the issue is addressed.

The illustrative embodiments attempt to avoid this scenario by providing techniques which use machine learning to predict: (i) the next state of a user device 102 or component 103; (ii) the time it will take for the user device 102 or component 103 to reach the next state; (iii) mitigation steps to prevent transition to the next state; and (iv) how much time is needed and when to perform the predicted mitigation steps.

The illustrative embodiments advantageously use historical data about previous device and component issues to train a machine learning model to predict future device or component states and mitigation steps to prevent the progression to the future states well in advance of escalation of the device or component issues. As an additional advantage, the embodiments predict the time it will take to complete the predicted mitigation steps, such that a user can be timely informed and the device where the issue is raised does not reach a critical and/or unworkable state. As explained in more detail herein, in some embodiments, support tickets are used as a source for previously implemented mitigation steps. When a ticket is resolved by a technical support agent, the resolution steps are referenced in the ticket. A decision tree is generated in accordance with historical mitigation steps.

Figure 2:
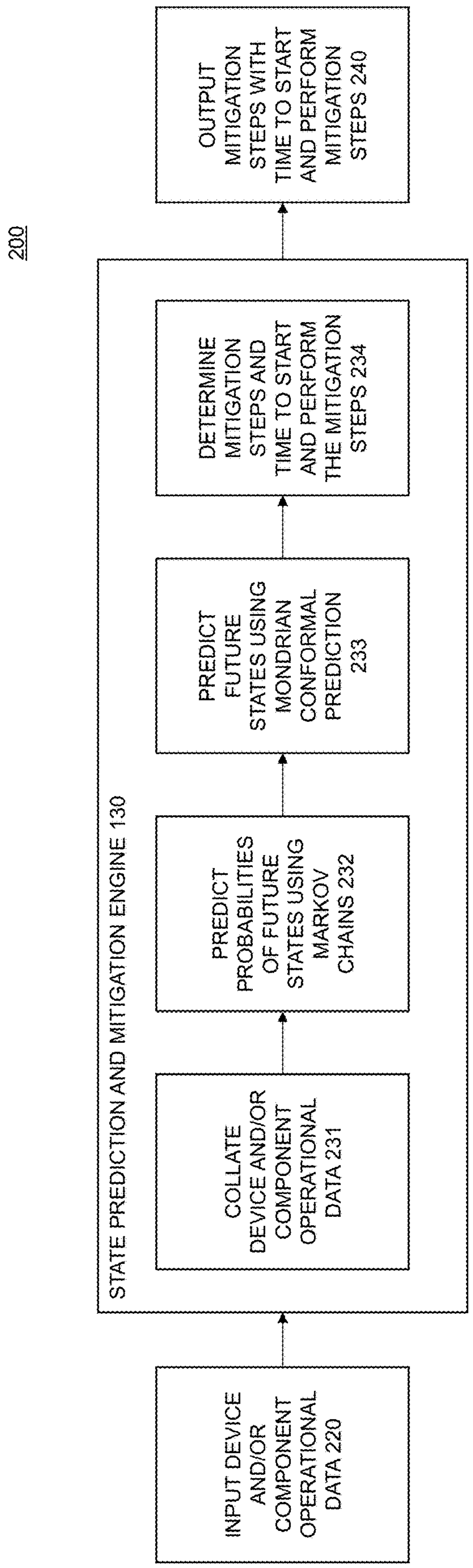
FIG. 2 depicts an operational flow for predicting device or component states and identifying steps to prevent failure in an illustrative embodiment.

Referring to the operational flow 200 in FIG. 2, at block 220, operational data corresponding to the user device 102 and the components 103 collected by the data collection engine 120 is input to the state prediction and mitigation engine 130. The operational data comprises state information of the user devices 102 and components 103, and comprises data from one or more logs. The data and logs include, but are not necessarily limited to, server logs, OS utilization data, server hardware configuration data, OS event logs, debug logs, application data and storage logs. Referring to block 231 of FIG. 2, the collating layer 131 collates the operational data, including the data in the logs. For example, in illustrative embodiments, the data is collated based on changes in the operational states of the user devices 102 and/or components 103, durations of the operational states before changing to a different operational state and/or whether the changes in the operational states resulted in failure of the user devices 102 and/or components 103. The data is also collated based on device type, device component type, alerts indicating one or more issues with the user devices 102 and/or components 103 and/or severity of the alerts.

The operational data including logs for various device and component operations is collected by the systems management applications 105 and/or the data collection engine 120, for example, at periodic intervals, in connection with support tickets and/or when requested by a user. The collected data provides details of the states of user devices 102 and components 103 over different time periods. The data sets when collated, provide present operational states, operational states that the user devices 102 and/or components 103 have transitioned to (e.g., before and during resolution of a support ticket), and the duration to transition to the other states.

For example, FIG. 3 depicts a table 300 of collated device and component data including component or device state transitions. As can be seen, different user devices 102 and their corresponding components are listed in the first two columns of table 300. For example, components 103 include, but are not necessarily limited to, HDDs, dual in-line memory modules (DIMMs), central processing units (CPUs), motherboards and fans. The table 300 further depicts alert types (e.g., head failures, configuration mismatches, unrecoverable machine failures, soft errors, medium error counts, aging of battery, overheating, dust, reduced speed and redundant array of independent disks (RAID) group failure) and severity of alert (e.g., critical and medium). As can be seen in the fifth column of the table 300, the collating layer 131 further collates transitions of the component or device states from the operational data and logs. For example, the HDD begins with a head failure, transitions to a medium error count and then to a system crash, the DIMM begins with a DIMM failure and progresses to performance degradation by 10%. In one instance a CPU failure progresses to a system crash, and in another instance to no system display. Other transitions are shown in the table 300. As can be seen, some of the transitions result in device failure, while others have not resulted in device failure.

FIG. 4 illustrates another example of the collated data based on current and next states and a duration to transition to the next state. For example, the table 400 collates multiple instances where fan failure transitioned to different states and the time it took to transition to those different states. As can be seen, it took 48 hours to transition from fan failure to performance being degraded by 10%, 72 hours to transition to overheating of the CPU, 48 hours to transition to HDD failure, 72 hours to transition to DIMM failure and 240 hours to transition to a system crash. Similar to FIG. 4, FIG. 5 depicts a table 500 which collates multiple instances where medium error counts of an HDD transitioned to RAID group failure, HDD head failure and a system crash, along with respective durations of 96 hours, 48 hours and 240 hours it took to transition to the different states.

Referring to block 232 of FIG. 2, the first level state prediction layer 132 predicts probabilities of future operational states of the user devices 102 and/or components 103 using a stochastic model. The prediction of the probabilities of the future operational states is based on the most recently known operational states of the user devices 102 and/or components 103. In illustrative embodiments, a machine learning algorithm trained with at least a portion of the collated data from the collating layer 131 predicts the probability of the future device and component states. The prediction is dependent on a current device or component state (e.g., most recent state known to the machine learning algorithm). In a non-limiting illustrative embodiment, a Markov chain model is used to predict future state probabilities. Markov chain analysis uses a current state to predict a next state, and does not consider states prior to the current state or how the current state was reached.

Figure 6:
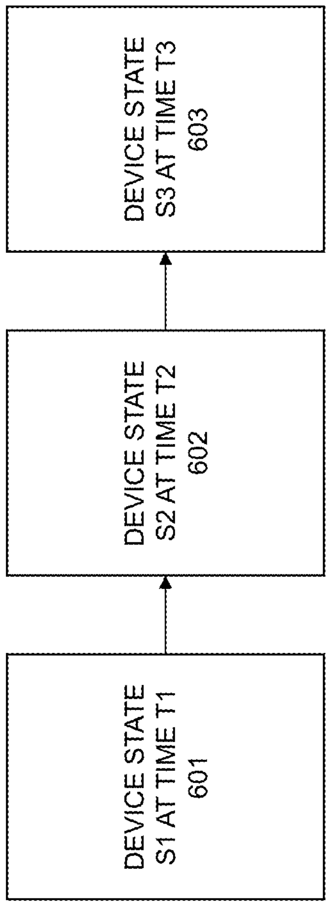
FIG. 6 depicts a Markov chain of different device states at different times in an illustrative embodiment.

In an operational example using Markov analysis, when an alert is received by a faulty one of the components 103 or user device 102, the future state is predicted without depending on the details on how the component 103 or user device 102 reached its present state. For example, referring to the Markov chain diagram 600 in FIG. 6, a device is in a first state S1 at time T1 (601), a second state S2 at time T2 (602) and third state S3 at time T3 (603). Using Markov analysis, the device state S3 at time T3 is only dependent on the device state S2 at time T2, and device state S1 at time T1 is irrelevant. In other words, only the most recent point (most recent device state) in the trajectory affects the next point (next state).

The state of a Markov chain is the value of $X_t$ at time t. S represents the state space of a Markov chain (e.g., the possible values of $X_t$). The Markov chain analysis can be represented by the following formula (1):

$$P(X_{t+1}=S|X_t=S_t, X_{t-1}=S_{t-1}, \ldots X_0=S_0)=P(X_{t+1}=S|X_t=S_t) \quad (1)$$

for all t=1, 2, 3, . . . etc. and for all device states $S_0$, $S_1$, $S_2$, . . . $S_t$.

Figure 7:
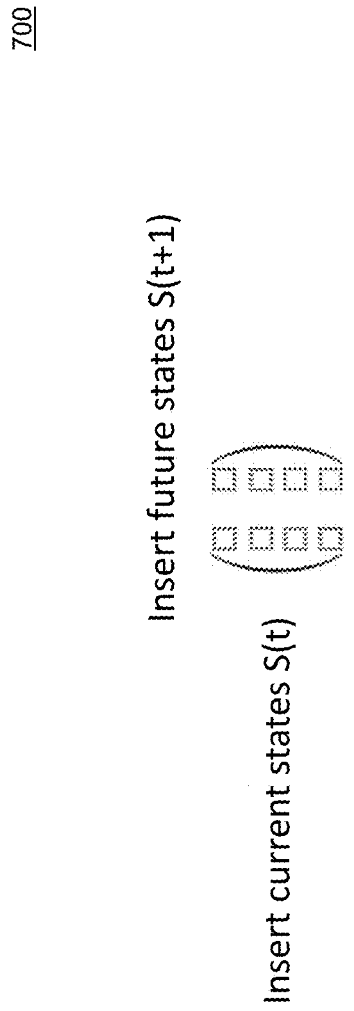
FIG. 7 depicts a matrix used in connection with predicting next device states with Markov chain techniques in an illustrative embodiment.

To determine the probabilities of the next component or device states, a transition matrix in accordance with the Markov chain is generated. Referring to FIG. 7, the matrix 700 comprises rows corresponding to current device or component states (e.g., most recent known operational states) at times t (e.g., $S_1$, $S_2$, $S_3$, etc.) and columns corresponding to the future device or component states at times t+1 (e.g., $S_2$, $S_3$, $S_4$, etc.). The probabilities of the device or component states comprise the entries on the matrix 700. The rows in the matrix 700 (current state ("Now")) add up to 1, and the columns in the matrix 700 (future state ("Next")) also add up to 1.

Referring to formula (2) below, matrix P lists all the possible device states in the state space S. The matrix is a square matrix because its values are in the same state space S of size N.

$$p_{ij}=P(X_{t+1}=j|X_t=i) \quad (2)$$

where probability of transitioning from state i to state j is the conditional probability for Next j, given Now i for the entry (i, j).

Referring to block 233 of FIG. 2, the second level state prediction layer 133 predicts the future operational states of the user devices 102 and/or components 103 using a conformal prediction model (e.g., Mondrian conformal prediction). The predictions are based on the respective probabilities of the future operational states determined by the first level state prediction layer 132. In applying the conformal prediction model, a random forest model is used to compute a conformity value of the respective probabilities of the future operational states.

In more detail, based on probability ratios derived using the Markov chain, the future device states are predicted by the second level state prediction layer 133. Using, for example, Mondrian conformal prediction, the second level state prediction layer 133 splits the dataset containing the probabilities of the transition of the device and component states into three datasets, namely training, calibration and test datasets. A random forest with multiple trees (e.g., ≥100 trees) is used for calculating a conformity measure of the predicted state probabilities.

Referring to block 234 of FIG. 2, the mitigation layer 134 determines mitigation steps to prevent transition to the next start and the time to start and perform the mitigation steps. The mitigation steps are determined from a combination of the current, previous and predicted future states of the user devices 102 and/or components 103. In a non-limiting illustrative example, some of the mitigation steps include, but are not necessarily limited to, initiating a dispatch, initiating a data migration, upgrading software and/or shutting down resource intensive services.

To determine the mitigation steps for an issue, a decision tree classifier used. A decision tree classifier is trained with the data corresponding to the operation of the user devices 102 and components 103 using a supervised learning technique. The tree-structured classifier evaluates problems through a graphical representation to obtain multiple possible solutions based on a given condition.

Figure 8:
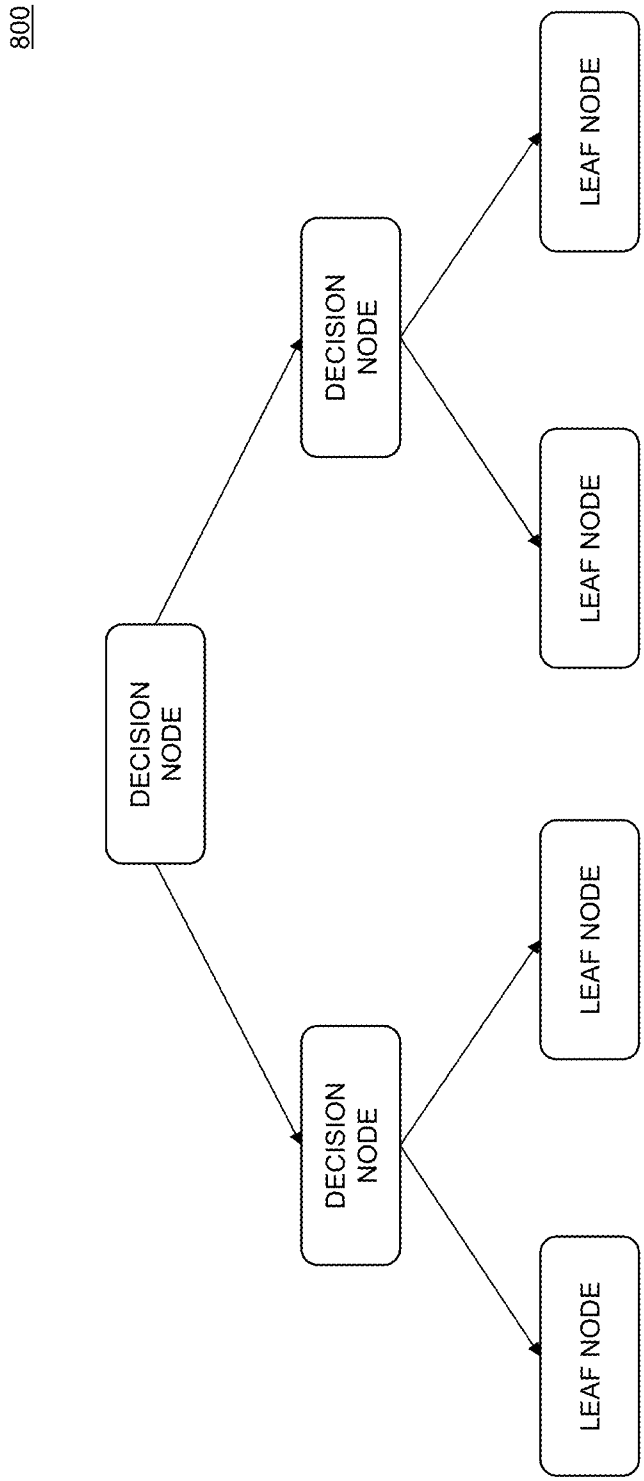
FIG. 8 depicts different types of nodes in a decision tree to identify mitigation steps to prevent component or device failure in an illustrative embodiment.

There can be multiple mitigation steps involved in the resolution of an issue. Referring to the decision tree 800 in FIG. 8, when the mitigation steps are plotted on a decision tree, the data is applied to decision nodes and leaf nodes, where each decision node represents a decision and each leaf node is an outcome of a decision.

The table 900 in FIG. 9 illustrates sample data used for generating a decision tree to identify mitigation steps to prevent component or device failure. The data on which the decision tree is based includes, but is not necessarily limited to, device model, component type, issue reported date, operational data-based issue seen date (e.g., when issue appeared, may be different from issue reported date), issue description, mitigation steps taken, issue closure date, operational data-based issue closure date (may be different from issue closure date), previous state and next state.

The table 900 depicts sample data collected from issues raised for various user devices 102 and their corresponding components 103 for different types of issues or failures over a period of time, and lists the mitigation steps taken by the technical support agents to resolve the issues or failures.

In the columns taken in order from left to right, model corresponds a model of the user device 102 where the issue was seen, component corresponds to a component 103 of the user device 102 where the issue was seen, issue reported date corresponds to the date when the issue was reported to technical support agents, operational data-based issue seen date corresponds to the date when the issue was seen after analyzing the operational data, issue corresponds to the actual issue reported, mitigation steps correspond to the steps followed by technical support personnel to mitigate the issue (e.g., prevent the occurrence of the next state), issue closure date corresponds to the date when the issue was closed by technical support, operational data-based issue closure date corresponds to the date when the issue ceased to be reported after collating the operational data, previous state corresponds to a previous state of the device while the current issue was reported after collating the data, and next state corresponds to the next possible state of the user device 102 or component 103 with respect to the reported (e.g., current) issue.

The target variable for the decision tree is mitigation steps. To use the above data as training data and build the decision tree, the Gini index is computed for each of the features in accordance with the following formula (3).

$$\text{Gini Index}=1-\Sigma_j P_j^2 \tag{3}$$

P is the ratio of a class at the $i^{th}$ node. The Gini index determines the purity or impurity of a feature at the time of creating a decision tree. In more detail, the Gini index is a measurement of the likelihood of an incorrect classification of a new instance of a random variable, if that new instance were randomly classified according to the distribution of class labels from the data set. In other words, is used to determine optimal splitting of a decision tree. To determine the root node for the decision tree, the mitigation layer 134 computed the weighted average of the Gini index for each of the features (e.g., the columns in the table 900). Once the Gini index of all the features is determined, the feature with the lowest Gini index is assigned as the root node. Once the root node is determined, the process is repeated for each leaf node to construct the decision tree with a mapping based on the Gini indexes.

Figure 11:
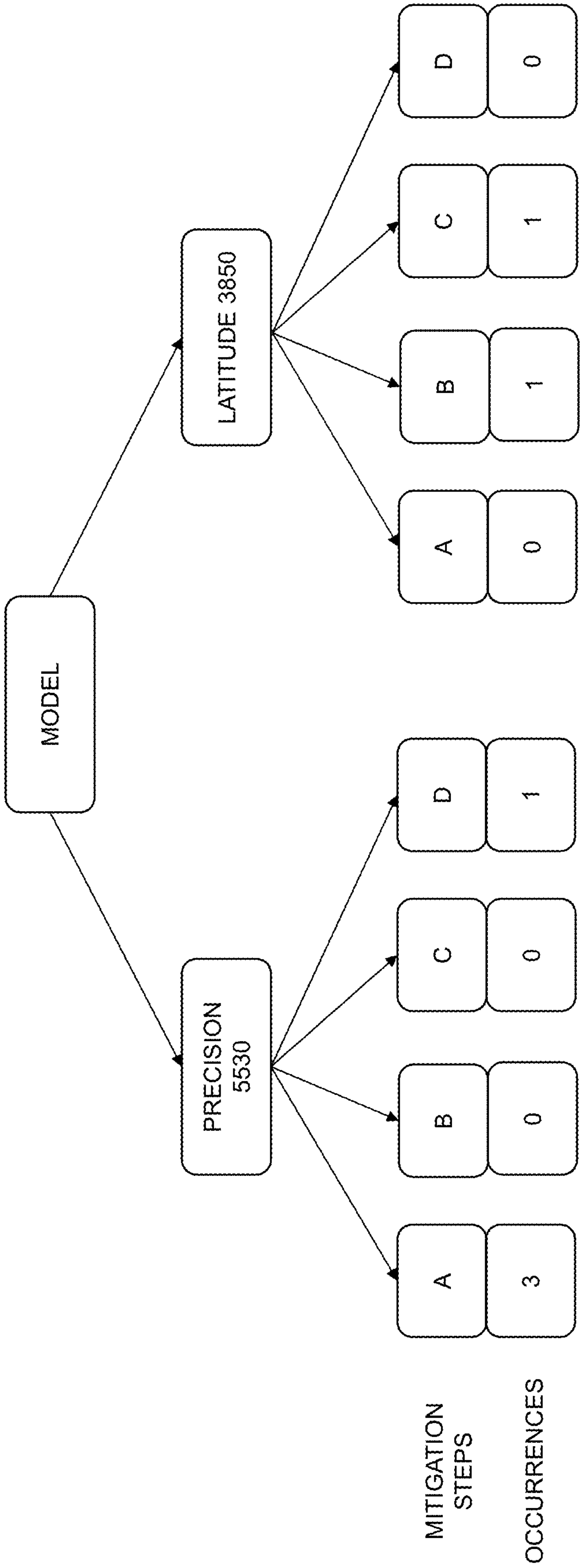
FIG. 11 depicts a decision tree generated in accordance with the data in FIG. 10 in an illustrative embodiment.

For example, in computing the Gini index for the "model" feature, the mitigation steps and the number of occurrences of each mitigation step are considered. Referring to the table 1000 in FIG. 10, which is based on the data in table 900, the mitigation steps performed for different device models are shown. For example, for the Precision 5530 model, the fan was replaced three times and the CPU was replaced once. For the Latitude 3850 model, having the drive usage at more than 98 percent was performed once and replacement of the battery was also performed once. Referring to FIG. 11, a decision tree 1100 generated in accordance with the data in FIG. 10 is shown. Using model as the root node, for each model (e.g., Precision 5530 and Latitude 3850) leaf nodes representing mitigation steps (A, B, C, and D) and the number of occurrences of each mitigation step extend therefrom. For example, for the Precision 5530 model, leaf node A represents fan replacement, which occurred three times and leaf node D represents CPU replacement, which occurred one time (showing numbers 3 and 1, respectively). Leaf nodes B and C correspond to drive usage at more than 98 percent and replacement of the battery, which was not seen in the data for the Precision 5530 model (showing 0 for both). For the Latitude 3850 model, drive usage at more than 98 percent and replacement of the battery were each performed one time (leaf nodes B and C, corresponding to indications of 1 occurrence), and fan and CPU replacement (leaf nodes A and D) were not performed (showing 0 for both).

$$\begin{aligned}&\text{For the left side of the decision tree 1100}\\&\text{(i.e., for Model–Precision 5530):}\\\text{Gini Index}&=1-\text{square of }(A/\text{total})-\text{square of }(B/\text{total})-\\&\quad\text{square of }(C/\text{total})-\text{square of }(D/\text{total})\\&=1-\text{square of }(3/4)-0-0-\text{square of }(1/4)\\&=1-0.5625-0.0625\\&=0.375\end{aligned} \tag{i}$$

$$\begin{aligned}&\text{For the right side of the decision tree 1100}\\&\text{(i.e., for Model–Latitude 3850):}\\\text{Gini Index}&=1-\text{square of }(A/\text{total})-\text{square of }(B/\text{total})-\\&\quad\text{square of }(C/\text{total})-\text{square of }(D/\text{total})\\&=1-0-\text{square of }(1/2)-\text{square of }(1/2)-0\\&=1-0.25-0.25\\&=0.5\end{aligned} \tag{ii}$$

-continued

For the "model" feature the weighted average of the Gini Index ((*i*) and (*ii*)) is $$\text{Weighted Average} = (\text{Gini Index} * \text{Total Occurences for Precision 5530}) + (\text{Gini Index} * \text{Total Occurrences for Latitude 3850}) / (\text{Total Occurrences for each model})$$

$$= (0.375 * 4 + 0.5 * 2)/6$$

$$= (1.5 + 1)/6$$

$$= 0.4166667$$

Figure 12:
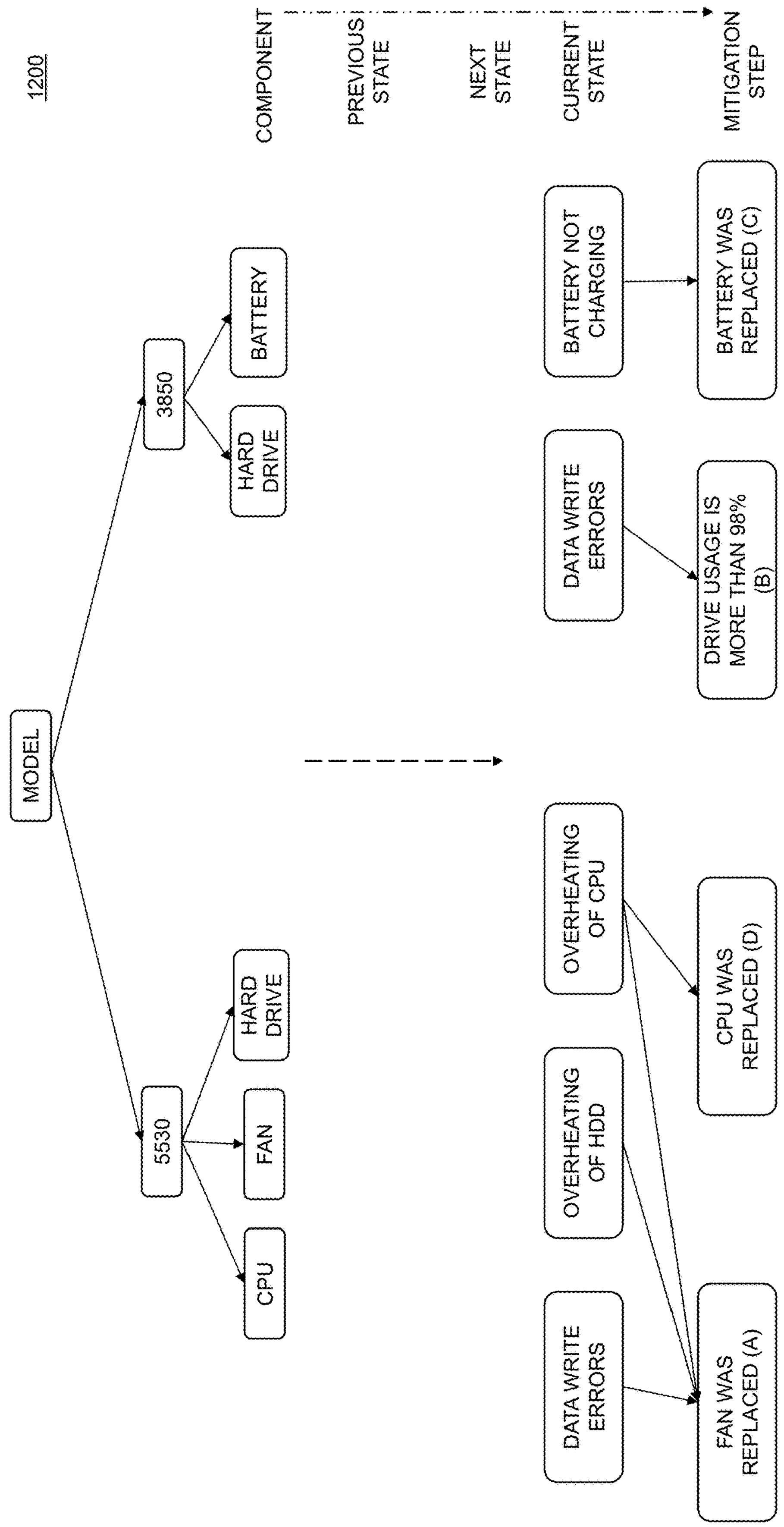
FIG. 12 depicts a decision tree to identify mitigation steps to prevent component or device failure in an illustrative embodiment.

Therefore, the weighted average Gini Index for the "model" feature is 0.4166667. Similarly, the mitigation layer 134 computes the weighted average Gini index for the remaining features. The feature with the lowest Gini index is assigned as the root node of the decision tree. Assuming after the computations that "model" feature results in the lowest Gini index, Model is assigned as the root node, and a decision tree like the decision tree 1200 in FIG. 12 is generated.

The decision tree 1200 includes mappings and classifications for the previous and next states associated with respective current states. The mitigation layer 134 uses the generated decision tree (e.g., decision tree 1200) to identify the mitigation steps for a particular issue based on the current, next and previous states associated with the issue.

Additionally, the time to start and perform the mitigation steps is determined based on the generated decision tree and the operational data. For example, the operational data-based issue seen date and the closure date is used to find an estimated time that was consumed to address an issue for a particular user device 102 or component 103 with the given mitigation steps.

In more detail, estimated duration to resolve an issue (t)=(operational data-based issue closure date−operational data-based issue seen date). Based on this estimated duration "t" required to complete the mitigation steps while in the current state, referring to block 240 in FIG. 2, the report generation layer 141 of the output engine generates a report for a user or for technical support personnel that it will take time "t" to perform the mitigation steps so that the user device 102 or component 103 does not transition to the next state where failure or further degradation of the user device 102 and/or components 103 may occur. The report can be transmitted to user or technical support personnel via, for example, one of the user devices 102 or technical support devices 107.

Figure 14A:
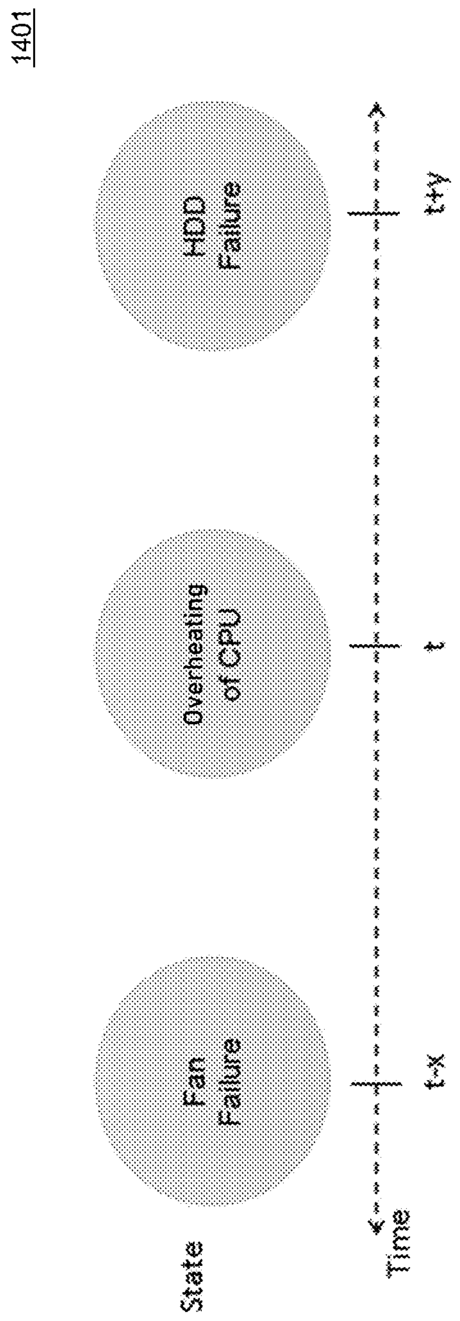
FIG. 14A depicts a timeline illustrating possible previous and next component states based on the component issue data from the table in FIG. 13 in an illustrative embodiment.

Referring to the table 1300 in FIG. 13, in an operational example, an issue raised from a customer may specify a model and a component issue (e.g., overheating of the CPU). The issue reported date is assumed to be time "t". Following the above-described operations by the collating, first level state prediction and second level state prediction layers 131, 132 and 133, the previous state and possible next state is determined for the data in table 1300. Referring to the timeline diagram 1401 in FIG. 14A, it is assumed that the previous state is fan failure, and the predicted future state is HDD failure. The time at the current state is t, the time at the previous state is t-x and the time when the future state is reached is t+y. Using the trained model and generated decision tree, in this operational example, the mitigation step(s) specify fan replacement. Using the operational data-based issue closure and seen dates, the mitigation layer 134 computes the estimated time required to do perform the mitigation step(s). In this operational example, the computed time is y−2, which is the time to perform the mitigation step(s).

Figure 14B:
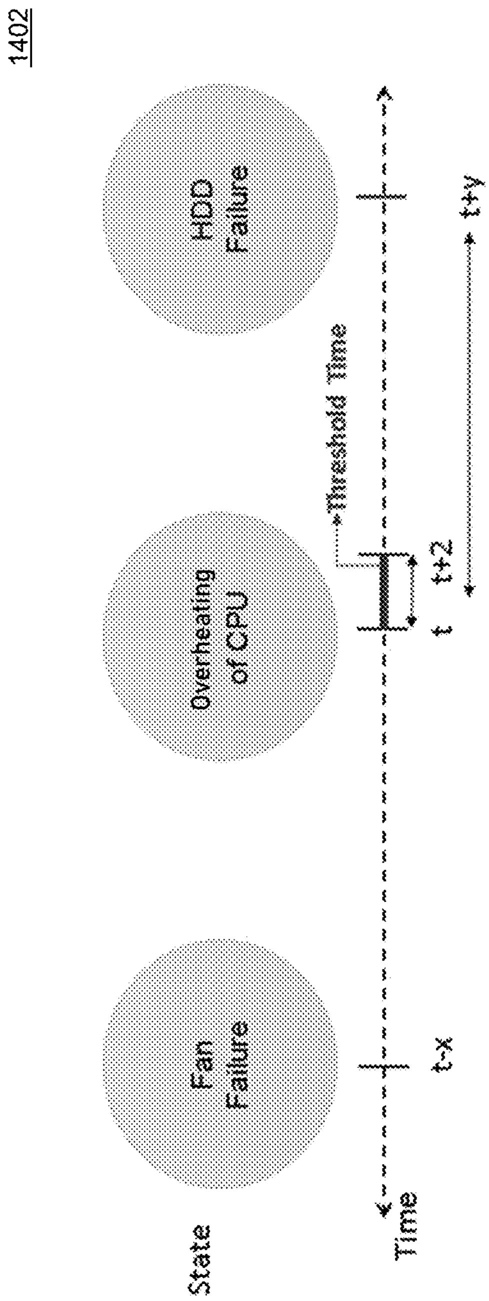
FIG. 14B depicts a remodeled timeline of the timeline in FIG. 14A to include an estimated time to perform mitigation steps in an illustrative embodiment.

Referring to the timeline diagram 1402 in FIG. 14B, the timeline diagram 1401 is remodeled to reflect the time to perform the mitigation step(s). For example, the time available for a user to start and perform mitigation steps is calculated as below (all values in days):

Current Time: t

Time at next state: t+y

Time needed to perform mitigation steps: y−2

$$\text{Time left before mitigation can be started} = \text{Time at next state} - \text{Current Time} - \text{Time needed to perform mitigation steps}$$

$$= t + y - t - (y - 2)$$

$$= t + y - t - y + 2$$

$$= 2$$

For the above calculation, it is determined that two days is the optimal time or time left for the user to start the mitigation steps (e.g., Threshold Time). If the mitigation steps are not performed within the two days, the next state may be reached, resulting in failure or further degradation of the user device 102.

In the timeline diagrams 1401 and 1402, the time from t to t+y represents to time to transition from the current state to the next state. Based on the computations described above, the time represented by t to t+2 is the Threshold Time, identifying when the mitigation steps should be started by the user. By using the machine algorithms to predict the mitigation steps in real-time or at the very least well in advance of progressing to the next state, the embodiments permit a user to be informed about the predicted mitigation steps before the Threshold Time runs out and the user device 102 and/or component 103 transitions to the next state.

Using the one or more machine learning algorithms, the mitigation layer 134 identifies one or more actions (e.g., mitigation steps) to prevent the user devices 102 and/or components 103 from transitioning to a future operational state, and the time period in which to perform the one or more actions. A report generation layer 141 of the output engine 140 generates instructions comprising the one or more actions and identified time period, and causes transmission of the instructions to one or more user devices 102 and/or technical support devices 107 over network 104. In one or more embodiments, upon receipt of the instructions, the user devices 102 automatically implement one or more of the mitigation steps that can be performed by automated means such as, for example, initiating a dispatch, initiating a data migration, upgrading software and/or shutting down resource intensive services.

According to one or more embodiments, the database 150 and other data repositories or databases referred to herein can be configured according to a relational database management system (RDBMS) (e.g., PostgreSQL). In some embodiments, the database 150 and other data repositories or databases referred to herein are implemented using one or more storage systems or devices associated with the state prediction and failure prevention platform 110. In some embodiments, one or more of the storage systems utilized to implement the database 150 and other data repositories or databases referred to herein comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the state prediction and failure prevention platform 110, the data collection engine 120, state prediction and mitigation engine 130, output engine 140 and/or database 150 in other embodiments can be implemented at least in part externally to the state prediction and failure prevention platform 110, for example, as stand-alone servers, sets of servers or other types of systems coupled to the network 104. For example, the data collection engine 120, state prediction and mitigation engine 130, output engine 140 and/or database 150 may be provided as cloud services accessible by the state prediction and failure prevention platform 110.

The data collection engine 120, state prediction and mitigation engine 130, output engine 140 and/or database 150 in the FIG. 1 embodiment are each assumed to be implemented using at least one processing device. Each such processing device generally comprises at least one processor and an associated memory, and implements one or more functional modules for controlling certain features of the data collection engine 120, state prediction and mitigation engine 130, output engine 140 and/or database 150.

At least portions of the state prediction and failure prevention platform 110 and the elements thereof may be implemented at least in part in the form of software that is stored in memory and executed by a processor. The state prediction and failure prevention platform 110 and the elements thereof comprise further hardware and software required for running the state prediction and failure prevention platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the data collection engine 120, state prediction and mitigation engine 130, output engine 140, database 150 and other elements of the state prediction and failure prevention platform 110 in the present embodiment are shown as part of the state prediction and failure prevention platform 110, at least a portion of the data collection engine 120, state prediction and mitigation engine 130, output engine 140, database 150 and other elements of the state prediction and failure prevention platform 110 in other embodiments may be implemented on one or more other processing platforms that are accessible to the state prediction and failure prevention platform 110 over one or more networks. Such elements can each be implemented at least in part within another system element or at least in part utilizing one or more stand-alone elements coupled to the network 104.

It is assumed that the state prediction and failure prevention platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the data collection engine 120, state prediction and mitigation engine 130, output engine 140, database 150 and other elements of the state prediction and failure prevention platform 110, and the elements thereof can each be implemented in the form of one or more LXCs running on one or more VMs. Other arrangements of one or more processing devices of a processing platform can be used to implement the data collection engine 120, state prediction and mitigation engine 130, output engine 140 and database 150, as well as other elements of the state prediction and failure prevention platform 110. Other portions of the system 100 can similarly be implemented using one or more processing devices of at least one processing platform.

Distributed implementations of the system 100 are possible, in which certain elements of the system reside in one data center in a first geographic location while other elements of the system reside in one or more other data centers in one or more other geographic locations that are potentially remote from the first geographic location. Thus, it is possible in some implementations of the system 100 for different portions of the state prediction and failure prevention platform 110 to reside in different data centers. Numerous other distributed implementations of the state prediction and failure prevention platform 110 are possible.

Accordingly, one or each of the data collection engine 120, state prediction and mitigation engine 130, output engine 140, database 150 and other elements of the state prediction and failure prevention platform 110 can each be implemented in a distributed manner so as to comprise a plurality of distributed elements implemented on respective ones of a plurality of compute nodes of the state prediction and failure prevention platform 110.

It is to be appreciated that these and other features of illustrative embodiments are presented by way of example only, and should not be construed as limiting in any way. Accordingly, different numbers, types and arrangements of system elements such as the data collection engine 120, state prediction and mitigation engine 130, output engine 140, database 150 and other elements of the state prediction and failure prevention platform 110, and the portions thereof can be used in other embodiments.

It should be understood that the particular sets of modules and other elements implemented in the system 100 as illustrated in FIG. 1 are presented by way of example only.

In other embodiments, only subsets of these elements, or additional or alternative sets of elements, may be used, and such elements may exhibit alternative functionality and configurations.

For example, as indicated previously, in some illustrative embodiments, functionality for the state prediction and failure prevention platform can be offered to cloud infrastructure customers or other users as part of FaaS, CaaS and/or PaaS offerings.

Figure 15:
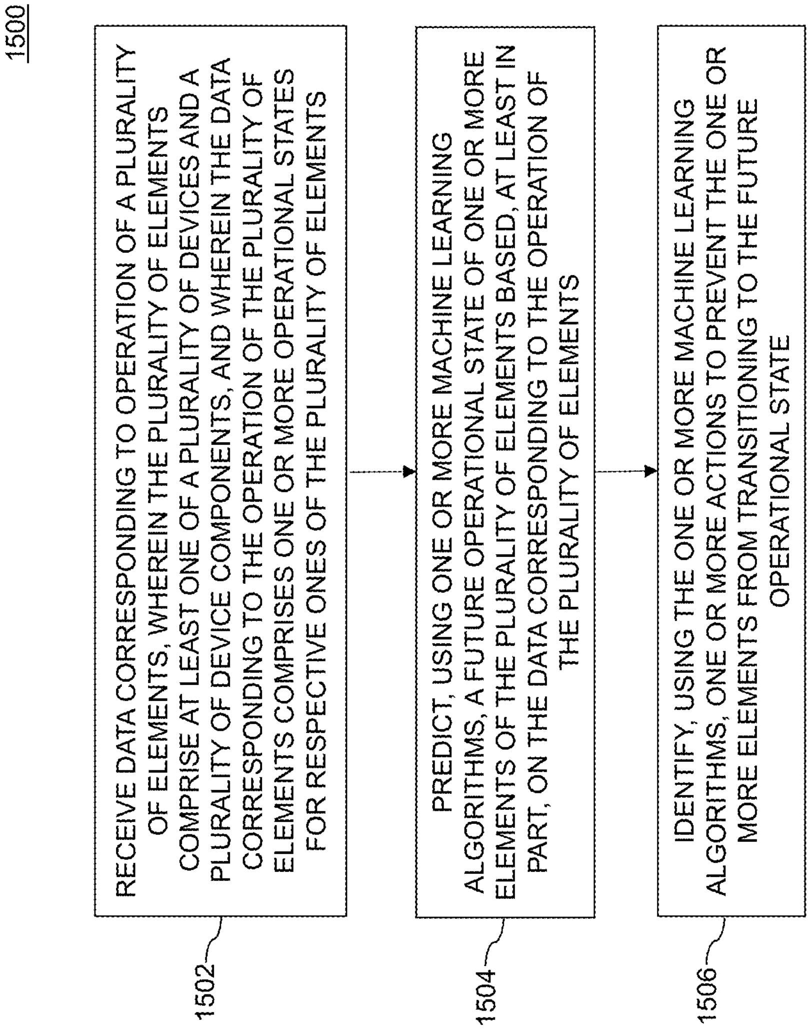
FIG. 15 is a flow diagram of an exemplary process for predicting device or component states and identifying steps to prevent failure in an illustrative embodiment.

The operation of the information processing system 100 will now be described in further detail with reference to the flow diagram of FIG. 15. With reference to FIG. 15, a process 1500 for state prediction and failure prevention as shown includes steps 1502 through 1506, and is suitable for use in the system 100 but is more generally applicable to other types of information processing systems comprising a state prediction and failure prevention platform configured for state prediction and failure prevention.

In step 1502, data corresponding to operation of a plurality of elements is received. The plurality of elements comprise at least one of a plurality of devices and a plurality of device components. The data corresponding to the operation of the plurality of elements comprises one or more operational states for respective ones of the plurality of elements. In step 1504, using one or more machine learning algorithms, a future operational state of one or more elements of the plurality of elements is predicted based, at least in part, on the data corresponding to the operation of the plurality of elements. In step 1506, using the one or more machine learning algorithms, one or more actions to prevent the one or more elements from transitioning to the future operational state are identified. Using the one or more machine learning algorithms, a time period in which to perform the one or more actions is identified. The one or more actions and the time period in which to perform the one or more actions are transmitted to at least one user device.

In illustrative embodiments, the data corresponding to the operation of the plurality of elements comprises a plurality of log entries. The data in the plurality of log entries is collated based, at least in part, on one or more of changes in the one or more operational states, durations of the one or more operational states before changing to a different operational state and whether the changes in the one or more operational states resulted in failure of one or more of the plurality of elements. The data in the plurality of log entries may also be collated based, at least in part, on one or more of device type, device component type, alerts indicating one or more issues with the plurality of elements and severity of the alerts.

In illustrative embodiments, predicting the future operational state of the one or more elements comprises using a stochastic model to predict respective probabilities of one or more future operational states of the one or more elements based on a most recent known operational state of the one or more elements. A matrix in accordance with the stochastic model is generated, wherein the matrix comprises one or more rows corresponding to the most recent known operational state of the one or more elements and one or more columns corresponding to the one or more future operational states of the one or more elements.

Predicting the future operational state of the one or more elements further comprises using a conformal prediction model to predict the future operational state of the one or more elements based on the respective probabilities of the one or more future operational states. A random forest model is used to compute a conformity value of the respective probabilities of the one or more future operational states.

Identifying the one or more actions comprises using the data corresponding to the operation of the plurality of elements as training data to generate a decision tree. Generating the decision tree comprises computing respective Gini indexes for respective ones of a plurality of features in the data corresponding to the operation of the plurality of elements. A root node of the decision tree is identified based, at least in part, on the respective Gini indexes. For at least one feature of the plurality of features, a computed Gini index is based, at least in part, on a plurality of actions that were performed to prevent at least a portion of the plurality of elements from transitioning to a plurality of future operational states, and a number of times respective ones of the plurality of actions were performed.

The one or more machine learning algorithms are trained with at least a portion of the data corresponding to the operation of the plurality of elements and comprise, for example, a random forest machine learning algorithm.

It is to be appreciated that the FIG. 15 process and other features and functionality described above can be adapted for use with other types of information systems configured to execute state prediction and failure prevention services in a state prediction and failure prevention platform or other type of platform.

The particular processing operations and other system functionality described in conjunction with the flow diagram of FIG. 15 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 15 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a state prediction and failure prevention platform as disclosed herein can provide a number of significant advantages relative to conventional arrangements. For example, the state prediction and failure prevention platform effectively uses machine learning techniques to predict future states of devices and components, which may lead to system failure. As an additional advantage, the embodiments provide techniques for using a stochastic model to predict, with minimal turnaround time, probabilities of future states. Based on the probabilities, conformal prediction techniques are leveraged to ascertain a next state a device or component would transition to from a current state if an issue is not resolved. At this stage a more accurate set of future device states is obtained. As a result, the embodiments enable more efficient use of compute resources, improve performance and reduce bottlenecks. For example, even though logs may be voluminous, the machine learning techniques implemented by the embodiments enable immediate (e.g., real-time) identification of issues in response to receipt of operational data.

The embodiments advantageously use machine learning algorithms to evaluate the operational data to predict device and component states. Unlike conventional techniques, the embodiments provide a framework for proactively predicting and alerting users of upcoming component and device states by analyzing current and previous states in operational logs. As an additional advantage, unlike current approaches, once an accurate set of future device or component states is obtained, the embodiments provide technical solutions to use machine learning to generate mitigation steps to prevent the transition to the future states. Additionally, an optimal time to start and complete performance of the mitigation steps is determined. A user is notified with the current and predicted future device or component states, the mitigation steps and the optimal time to start and perform the mitigation steps so that timely action can be taken to prevent unwanted or catastrophic failure or degradation of devices and components.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the state prediction and failure prevention platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a state prediction and failure prevention platform in illustrative embodiments. These and other cloud-based systems in illustrative embodiments can include object stores.

Illustrative embodiments of processing platforms will now be described in greater detail with reference to FIGS. 16 and 17. Although described in the context of system 100, these platforms may also be used to implement at least portions of other information processing systems in other embodiments.

Figure 16:
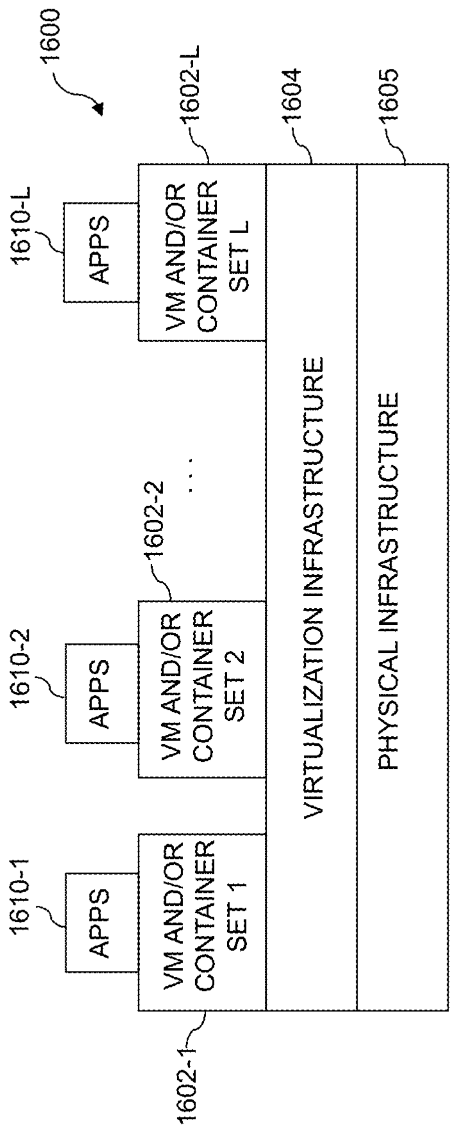
FIGS. 16 and 17 show examples of processing platforms that may be utilized to implement at least a portion of an information processing system according to illustrative embodiments.
Figure 17:
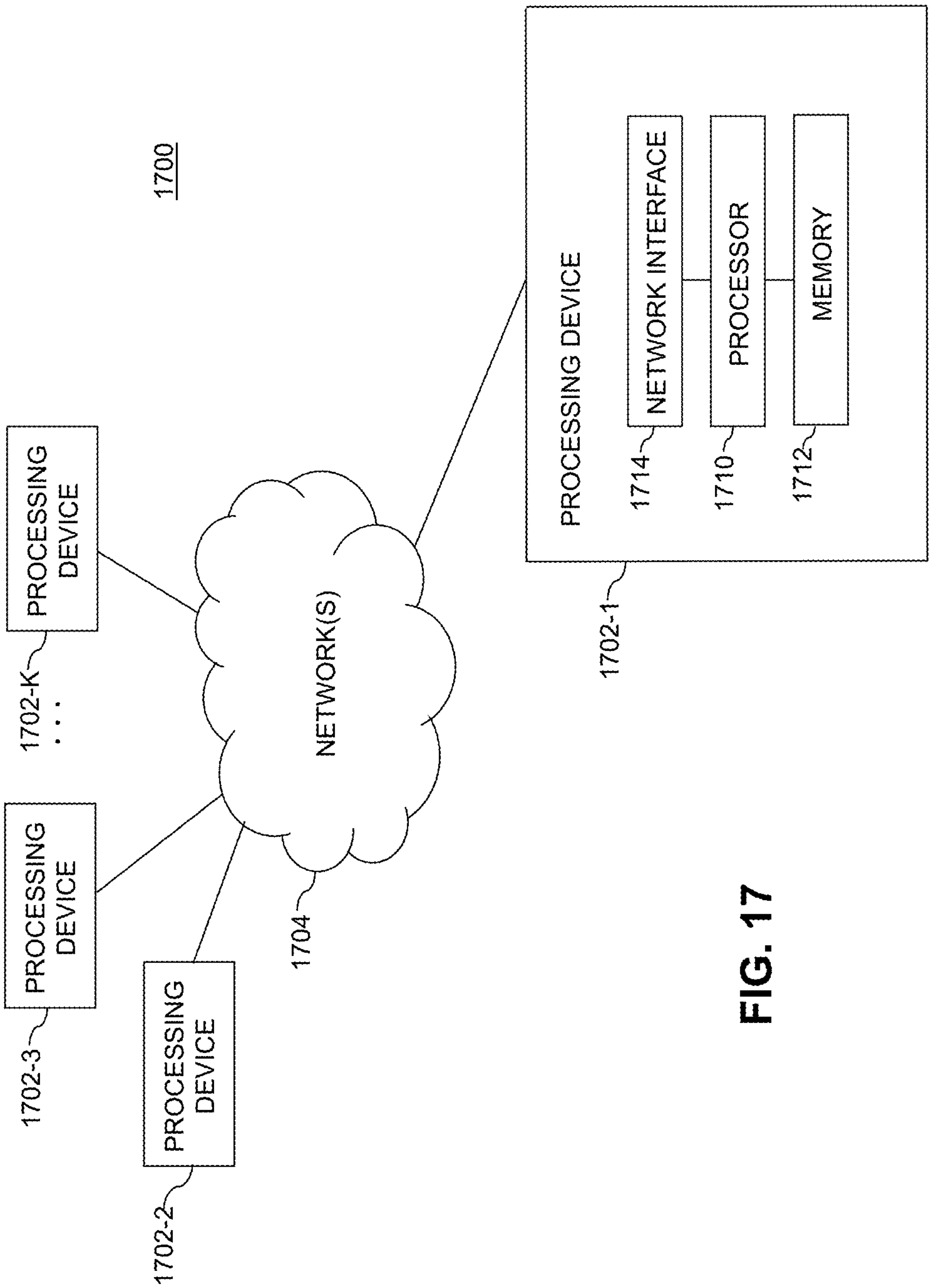

FIG. 16 shows an example processing platform comprising cloud infrastructure 1600. The cloud infrastructure 1600 comprises a combination of physical and virtual processing resources that may be utilized to implement at least a portion of the information processing system 100. The cloud infrastructure 1600 comprises multiple virtual machines (VMs) and/or container sets 1602-1, 1602-2, . . . 1602-L implemented using virtualization infrastructure 1604. The virtualization infrastructure 1604 runs on physical infrastructure 1605, and illustratively comprises one or more hypervisors and/or operating system level virtualization infrastructure. The operating system level virtualization infrastructure illustratively comprises kernel control groups of a Linux operating system or other type of operating system.

The cloud infrastructure 1600 further comprises sets of applications 1610-1, 1610-2, . . . 1610-L running on respective ones of the VMs/container sets 1602-1, 1602-2, . . . 1602-L under the control of the virtualization infrastructure 1604. The VMs/container sets 1602 may comprise respective VMs, respective sets of one or more containers, or respective sets of one or more containers running in VMs.

In some implementations of the FIG. 16 embodiment, the VMs/container sets 1602 comprise respective VMs implemented using virtualization infrastructure 1604 that comprises at least one hypervisor. A hypervisor platform may be used to implement a hypervisor within the virtualization infrastructure 1604, where the hypervisor platform has an associated virtual infrastructure management system. The underlying physical machines may comprise one or more distributed processing platforms that include one or more storage systems.

In other implementations of the FIG. 16 embodiment, the VMs/container sets 1602 comprise respective containers implemented using virtualization infrastructure 1604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1600 shown in FIG. 16 may represent at least a portion of one processing platform. Another example of such a processing platform is processing platform 1700 shown in FIG. 17.

The processing platform 1700 in this embodiment comprises a portion of system 100 and includes a plurality of processing devices, denoted 1702-1, 1702-2, 1702-3, . . . 1702-K, which communicate with one another over a network 1704.

The network 1704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1702-1 in the processing platform 1700 comprises a processor 1710 coupled to a memory 1712. The processor 1710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1712 may comprise random access memory (RAM), read-only memory (ROM), flash memory or other types of memory, in any combination. The memory 1712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1702-1 is network interface circuitry 1714, which is used to interface the processing device with the network 1704 and other system components, and may comprise conventional transceivers.

The other processing devices 1702 of the processing platform 1700 are assumed to be configured in a manner similar to that shown for processing device 1702-1 in the figure.

Again, the particular processing platform 1700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the state prediction and failure prevention platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and state prediction and failure prevention platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:

receiving data corresponding to operation of a plurality of elements, wherein the plurality of elements comprise at least one of a plurality of devices and a plurality of device components, and wherein the data corresponding to the operation of the plurality of elements comprises one or more current operational states of respective elements of the plurality of elements;

predicting, using one or more machine learning algorithms, one or more future operational states of one or more elements of the plurality of elements based, at least in part, on the data corresponding to the operation of the plurality of elements, wherein the predicting further comprises using a conformal prediction model to predict the one or more future operational states of the one or more elements based on respective probabilities of the one or more future operational states;

predicting, using the one or more machine learning algorithms, transition times for the one or more elements of the plurality of elements to transition from the one or more current operational states to the one or more future operational states; and identifying, using the one or more machine learning algorithms, one or more actions to be taken in advance of the predicted transition times to prevent the one or more elements from transitioning to the one or more future operational states;

wherein the steps of the method are executed by a processing device operatively coupled to a memory.

2. The method of claim 1 wherein:

the data corresponding to the current operational states of the respective elements of the plurality of elements comprises a plurality of log entries; and the method further comprises collating data in the plurality of log entries based, at least in part, on one or more of changes in one or more operational states, durations of the one or more operational states before changing to a different operational state and whether the one or more changes in the one or more operational states resulted in failure of one or more of the plurality of elements.

3. The method of claim 2 further comprising collating the data in the plurality of log entries based, at least in part, on one or more of device type, device component type, alerts indicating one or more issues with the plurality of elements and severity of the alerts.

4. The method of claim 2 further comprising training the one or more machine learning algorithms with at least a portion of the data corresponding to the operation of the plurality of elements.

5. The method of claim 1 wherein predicting the one or more future operational states of the one or more elements comprises using a stochastic model to predict the respective probabilities of the one or more future operational states of the one or more elements based on a most recent known operational state of the one or more elements.

6. The method of claim 5 wherein predicting the one or more future operational states of the one or more elements further comprises generating a matrix in accordance with the stochastic model, wherein the matrix comprises one or more rows corresponding to the most recent known operational state of the one or more elements and one or more columns corresponding to the one or more future operational states of the one or more elements.

7. The method of claim 1 wherein predicting the one or more future operational states of the one or more elements further comprises using a random forest model to compute a conformity value of the respective probabilities of the one or more future operational states.

8. The method of claim 1 wherein identifying the one or more actions comprises using the data corresponding to the operation of the plurality of elements as training data to generate a decision tree.

9. The method of claim 8 wherein generating the decision tree comprises:

computing respective Gini indexes for respective ones of a plurality of features in the data corresponding to the operation of the plurality of elements; and identifying a root node of the decision tree based, at least in part, on the respective Gini indexes.

10. The method of claim 9 wherein, for at least one feature of the plurality of features, a computed Gini index is based, at least in part, on a plurality of actions that were performed to prevent at least a portion of the plurality of elements from transitioning to a plurality of future operational states, and a number of times respective ones of the plurality of actions were performed.

11. The method of claim 1 wherein predicting the transition times comprises identifying, using the one or more machine learning algorithms, a time period in which to perform the one or more actions.

12. The method of claim 11 wherein the one or more actions and the time period in which to perform the one or more actions are transmitted to at least one user device.

13. The method of claim 1 wherein the one or more machine learning algorithms comprise a random forest machine learning algorithm.

14. An apparatus comprising:

a processing device operatively coupled to a memory and configured:

to receive data corresponding to operation of a plurality of elements, wherein the plurality of elements comprise at least one of a plurality of devices and a plurality of device components, wherein the data corresponding to the operation of the plurality of elements comprises one or more current operational states of respective elements of the plurality of elements;

to predict, using one or more machine learning algorithms, one or more future operational states of one or more elements of the plurality of elements based, at least in part, on the data corresponding to the operation of the plurality of elements, wherein the predicting further comprises using a conformal prediction model to predict the one or more future operational states of the one or more elements based on respective probabilities of the one or more future operational states;

to predict, using the one or more machine learning algorithms, transition times for the one or more elements of the plurality of elements to transition from the one or more current operational states to the one or more future operational states; and to identify, using the one or more machine learning algorithms, one or more actions to be taken in advance of the predicted transition times to prevent the one or more elements from transitioning to the one or more future operational states.

15. The apparatus of claim 14 wherein, in predicting the one or more future operational states of the one or more elements, the processing device is configured to use a stochastic model to predict the respective probabilities of the one or more future operational states of the one or more elements based on a most recent known operational state of the one or more elements.

16. The apparatus of claim 14 wherein predicting the transition times comprises identifying, using the one or more machine learning algorithms, a time period in which to perform the one or more actions.

17. The apparatus of claim 16 wherein the one or more actions and the time period in which to perform the one or more actions are transmitted to at least one user device.

18. The apparatus of claim 14 wherein the one or more machine learning algorithms comprise a random forest machine learning algorithm.

19. An article of manufacture comprising a non-transitory processor-readable storage medium having stored therein program code of one or more software programs, wherein the program code when executed by at least one processing device causes said at least one processing device to perform the steps of:

receiving data corresponding to operation of a plurality of elements, wherein the plurality of elements comprise at least one of a plurality of devices and a plurality of device components, and wherein the data corresponding to the operation of the plurality of elements comprises one or more current operational states of respective elements of the plurality of elements;

predicting, using one or more machine learning algorithms, one or more future operational states of one or more elements of the plurality of elements based, at least in part, on the data corresponding to the operation of the plurality of elements, wherein the predicting further comprises using a conformal prediction model to predict the one or more future operational states of the one or more elements based on respective probabilities of the one or more future operational states;

predicting, using the one or more machine learning algorithms, transition times for the one or more elements of the plurality of elements to transition from the one or more current operational states to the one or more future operational states; and identifying, using the one or more machine learning algorithms, one or more actions to be taken in advance of the predicted transition times to prevent the one or more elements from transitioning to the one or more future operational states.

20. The article of manufacture of claim 19 wherein, in predicting the one or more future operational states of the one or more elements, the program code causes said at least one processing device to use a stochastic model to predict the respective probabilities of the one or more future operational states of the one or more elements based on a most recent known operational state of the one or more elements.

* * * * *